(12) United States Patent
Kinoshita (10) Patent No.: US 6,820,611 B2
(45) Date of Patent: Nov. 23, 2004

(54) SOLAR RADIATION CONCENTRATOR AND METHOD OF CONCENTRATION SOLAR RADIATION

(76) Inventor: Mikio Kinoshita, 740-23-402, Kudencho, Sakae-ku, Yokohama-shi, Kanagawa 247-0014 (JP)

( * ) Notice: Subject to any disclaimer, the term of this patent is extended or adjusted under 35 U.S.C. 154(b) by 152 days.

(21) Appl. No.: 10/415,764
(22) PCT Filed: Nov. 8, 2001
(86) PCT No.: PCT/JP01/09762
§ 371 (c)(1), (2), (4) Date: Apr. 28, 2003
(87) PCT Pub. No.: WO02/39030
PCT Pub. Date: May 16, 2002

(65) Prior Publication Data
US 2004/0031483 A1 Feb. 19, 2004

(51) Int. Cl.⁷ .............................. F24J 2/38; F24J 2/52
(52) U.S. Cl. ................. 126/576; 126/605; 126/688; 126/696
(58) Field of Search ............................. 126/576, 577, 126/605–607, 688, 696; 359/853; 136/246

(56) References Cited
U.S. PATENT DOCUMENTS 1,111,239 A * 9/1914 Smelser .................. 126/607
4,056,313 A * 11/1977 Arbogast ................ 359/853
4,110,010 A * 8/1978 Hilton ..................... 136/246
4,218,114 A * 8/1980 Bunch .................... 126/688
4,365,618 A * 12/1982 Jones ..................... 126/576
4,425,904 A * 1/1984 Butler .................... 126/606
5,542,409 A * 8/1996 Sampayo ................ 126/606
6,220,241 B1 * 4/2001 Yeomans ................ 126/696

FOREIGN PATENT DOCUMENTS
JP          6-213514          8/1994

* cited by examiner

Primary Examiner—Sara Clarke (57) ABSTRACT

A solar radiation concentrator rotated about a straight line vertical to the reflector arrangement surfaces so that the incident solar radiation can be led onto the reflector arrangement surface along the specified direction and a method of concentrating solar radiation; the concentrator, comprising a plurality of reflectors (10) disposed on reflector arrangement surfaces, a plurality of reflector vertical bars (20) connected to the plurality of reflectors, rotating center holding members (30) for holding the center points of the rotating motions of the plurality of reflector vertical bars, motion members (40) for collectively rotating the plurality of reflector vertical bars, and guide members (50) for guiding the motions of the plurality of reflector vertical bars so that the plurality of reflector vertical bars can be rotated along specified reflector vertical bar routes, wherein the motion members perform motions along the specified motion member routes according to a variation in the incident angle of the incident solar radiation, and holes (40A) of a specified shape are provided in the motion members.

7 Claims, 7 Drawing Sheets

SOLAR RADIATION CONCENTRATOR AND METHOD OF CONCENTRATION SOLAR RADIATION

TECHNICAL FIELD

The present invention relates to a solar radiation concentrating apparatus and a method for concentrating solar radiation for use in a solar heat system, a solar heat power generation system, a solar cooker, a solar furnace, a photovoltaic power generation system, a distillation device, a sunlight illuminator, a chemical reactor system, or the like.

BACKGROUND ART

As a background art utilizing energy of solar radiation, there is a photovoltaic power generation system, a solar heat system, a solar furnace, a distillation apparatus such as a saline water desalination system, a chemical reactor system, or a sunlight illumination system, for example.

The energy density of solar radiation is about 1 KW/m$^2$. In operating these energy systems at a high energy density, solar radiation is concentrated. As a convergence element for concentrating solar radiation, there are a Fresnel lens, a parabolic mirror, and so forth, for example.

When solar radiation is concentrated to a solar energy conversion apparatus using a convergence optical system having such a convergence element, it is generally important to make an optical axis of the convergence optical system agree with an incident direction of solar radiation, in order to obtain a high concentration ratio. Namely, in a solar energy system having a tracking mechanism which rotates the convergence element in accordance with a variation of an incident direction of solar radiation and which makes the solar energy conversion apparatus agree with a focal point of the convergence element, solar radiation is utilized at a high concentration ratio.

In order to operate such a solar energy system for a long period of time, durability against a strong wind and so forth is required. When a height of the convergence element increases, a bad influence due to a wind pressure remarkably increases. Therefore, when a convergence element extending to a high altitude is utilized, the costs for maintaining a mechanical strength of the convergence element and the tracking mechanism increase. Thus, there has been a limit in utilizing a large convergence element.

Further, in irradiating a fixed region with solar radiation utilizing a large flat reflector and so forth, there has been a similar problem in making a large scale tracking mechanism.

As another background art, an energy system having a heliostat group is known. Such an energy system includes a plurality of flat reflectors and a plurality of tracking mechanisms which respectively drive the plurality of flat reflectors. Solar radiation reflected by the plurality of flat reflectors is concentrated to a fixed solar radiation concentration region. When solar radiation is concentrated at a high concentration ratio, many high-precision tracking mechanisms are loaded. However, the costs of the tracking mechanisms are high, and the reduction thereof is requested. Further, in using a large flat reflector, there have been problems associated with the bad influence due to the above-mentioned wind pressure or the large tracking mechanism.

As still another background art which is made from such a point of view, a sunlight convergence apparatus is disclosed in the Japanese Laid-Open Patent Publication No. 51-27347, which includes many small reflectors capable of being rotated around respective rotational centers on shafts, a controlling body, and a common link which connects each small reflector to the controlling body. Each small reflector is rotated with the same angular variation by moving the controlling body. When the controlling body is in a specified position, each small reflector is at an angle so as to reflect and concentrate a parallel light beam at a specific incident angle toward a prescribed concentration position. The sunlight convergence apparatus is designed so as to concentrate the reflected light from each small reflector to the concentration position, by controlling the position of the controlling body according to a variation of the incident angle of the parallel incident light beam.

However, in the sunlight convergence apparatus of which the whole plurality of reflectors are reviewed as a convergence optical system for concentrating solar radiation to the prescribed concentration position, there has been the problem that the concentration ratio is remarkably deteriorated with the increment of the variation of the incident angle of the incident light. However, such a decrease in the concentration ratio is not referred to in the Laid-Open Patent Publication No. 51-27347, and the teaching for overcoming this is not disclosed.

The present invention is made in view of the above, and an object of the present invention is to provide a novel solar radiation concentrating apparatus and a method for concentrating solar radiation, which realize a high concentration ratio for a wide range of the incident angle of incident light, and which collectively drive a plurality of reflectors.

Another object of the present invention is to provide a novel solar radiation concentrating apparatus and a method for concentrating solar radiation which utilize solar energy at a high concentration ratio.

Another object of the present invention is to provide a novel solar radiation concentrating apparatus and a method for concentrating solar radiation, having a high solar radiation collecting efficiency.

Another object of the present invention is to provide a novel solar radiation concentrating apparatus and a method for concentrating solar radiation at a low-cost.

Still another object of the present invention is to improve the durability of a solar energy system against an external environment such as a wind in a solar radiation concentrating apparatus.

DISCLOSURE OF INVENTION

According to an embodiment of the present invention, a novel solar radiation concentrating apparatus is provided. The solar radiation concentrating apparatus includes a plurality of reflectors for reflecting incident solar radiation along a prescribed incident direction region, a plurality of reflector vertical bars which are respectively connected to the plurality of reflectors, a center of rotation providing member which defines respective central points of rotational movements of the plurality of reflector vertical bars, a moving member for collectively rotating the plurality of reflector vertical bars, and a guide member which guides the movements of the plurality of reflector vertical bars so that the plurality of reflector vertical bars are rotated along respective prescribed reflector vertical bar orbits. The plurality of reflectors are arranged on a reflector arrangement surface. The moving member is moved with a prescribed moving member orbit in accordance with a variation of incident angle of the incident solar radiation. A hole is bored through the moving member along a curve corresponding to a track which is drawn on the moving member by the points of intersection between the moving member being moved with the prescribed moving member orbit and the plurality of reflector vertical bars being moved with the respective prescribed reflector vertical bar orbits. The plurality of reflector vertical bars are capable of being moved along the hole. The hole may be plural. Thus, reflected solar radiation reflected by the plurality of reflectors is concentrated to a prescribed concentration region at a high concentration ratio.

A guide hole having a prescribed shape for guiding the plurality of reflector vertical bars in a slidable state may be bored through the guide member.

The solar radiation concentrating apparatus may further include a rotational mechanism. The rotational mechanism rotates the plurality of reflectors, the plurality of reflector vertical bars, the center of rotation providing member, the moving member, and the guide member around a straight line perpendicular to the reflector arrangement surface so that a projection of the incident solar radiation is caused to be parallel to a prescribed incident direction indicating line defined in the reflector arrangement surface.

The moving member may define respective positions of the plurality of reflector vertical bars with respect to a direction approximately along the incident solar radiation. Further, the guide member may define respective positions of the plurality of reflector vertical bars with respect to a direction approximately perpendicular to the incident solar radiation.

The moving member may include a link and a plurality of rotating body which are collectively rotated by the link and which rotate the plurality of reflector vertical bars. Alternatively, the moving member may be a flat board member.

The solar radiation concentrating apparatus may further include a floating body.

According to another embodiment of the present invention, a novel solar radiation concentrating method is provided. By the method for concentrating solar radiation, a solar radiation concentrating apparatus is driven, which includes a plurality of reflectors arranged in a reflector arrangement surface and for reflecting incident solar radiation along a prescribed incident direction range, a plurality of reflector vertical bars respectively connected to the plurality of reflectors, a center of rotation providing member defining respective central points of rotational movements of the plurality of reflector vertical bars, a moving member for collectively rotating the plurality of reflector vertical bars, and a guide member for guiding the movements of the plurality of reflector vertical bars so that the plurality of reflector vertical bars are rotated along respective prescribed reflector vertical bar orbits, for concentrating reflected solar radiation reflected by the plurality of reflectors to a prescribed concentration region. The method for concentrating solar radiation includes a step of rotating the solar radiation concentrating apparatus around a straight line perpendicular to the reflector arrangement surface so that the incident solar radiation is incident along a prescribed direction in the reflector arrangement surface and a step of positioning the moving member to a prescribe position defined in accordance with an incident angle of the incident solar radiation.

BEST MODE FOR CARRYING OUT THE INVENTION

In order to illustrate the present invention in more detail, the present invention is explained referring to the accompanying drawings. The same reference numeral designates the same or corresponding part throughout the several views.

Figure 1:
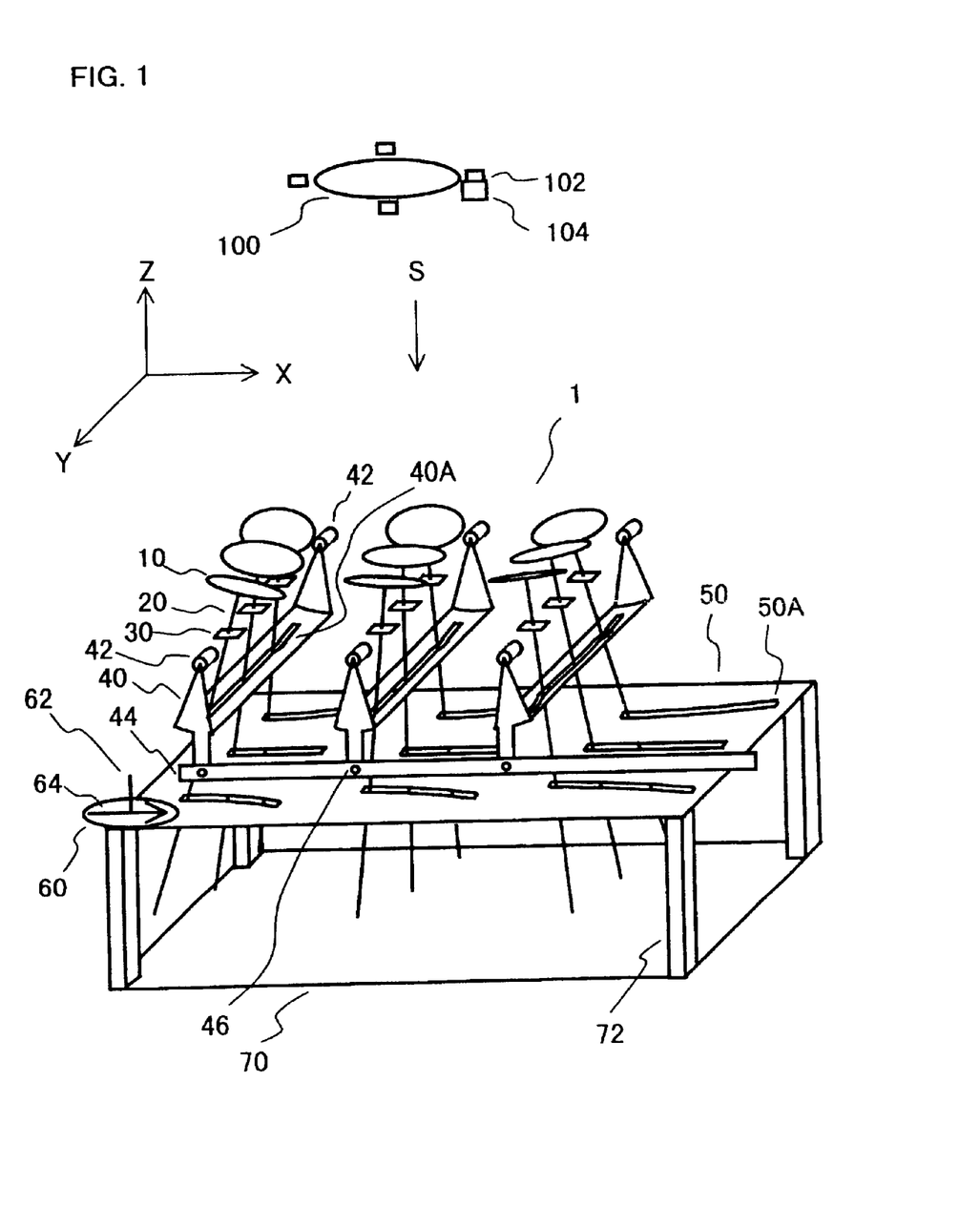
FIG. 1 is a conceptual view illustrating a solar radiation concentrating apparatus according to an embodiment of the present invention.
Figure 2:
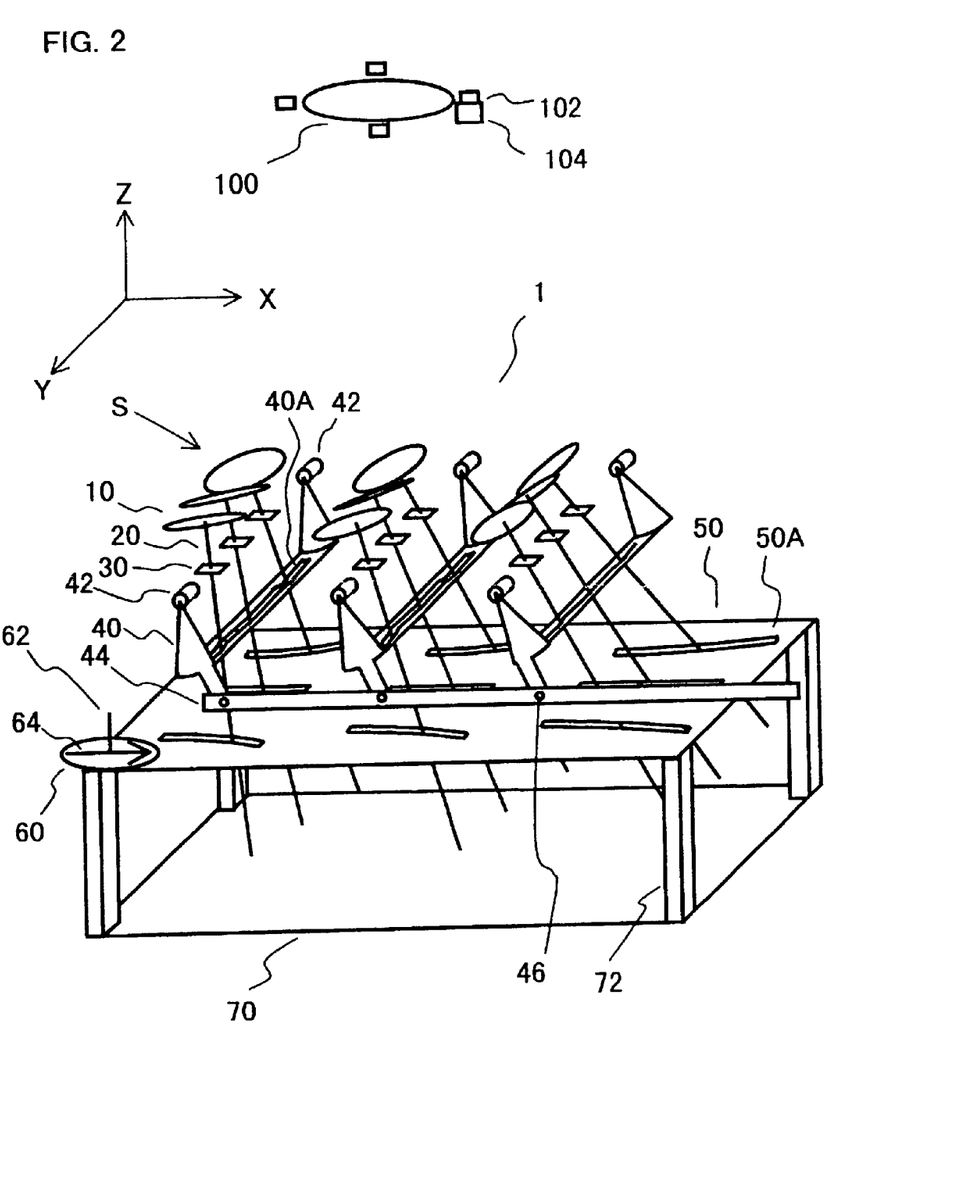
FIG. 2 is a conceptual view illustrating a state of the solar radiation concentrating apparatus when an incident angle of solar radiation is varied, in the solar radiation concentrating apparatus illustrated in FIG. 1.
Figure 3:
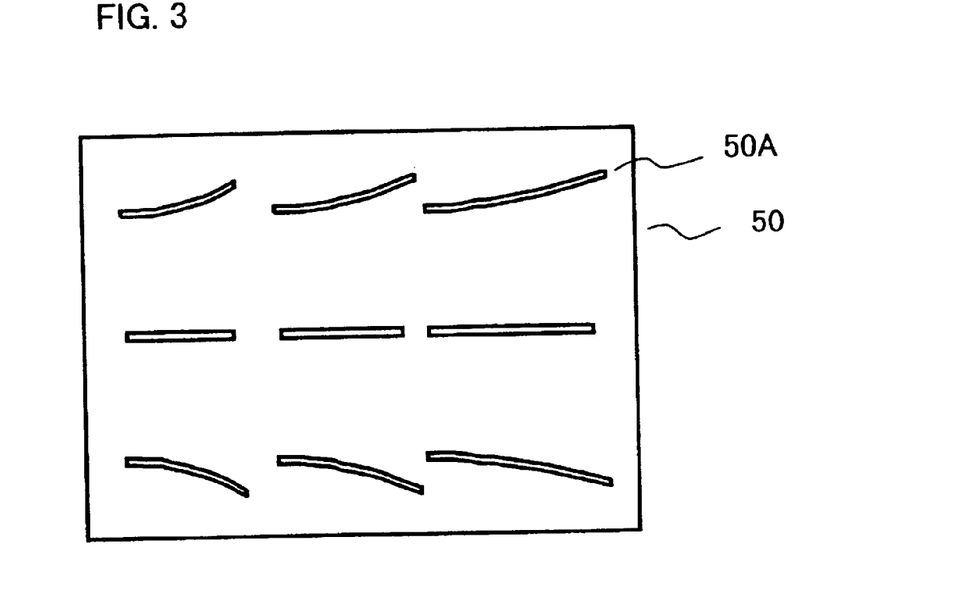
FIG. 3 is a schematic view illustrating a guide member illustrated in FIG. 1.

A solar radiation concentrating apparatus according to an embodiment of the present invention is explained referring to FIGS. 1–3. FIG. 1 is a conceptual view illustrating the solar radiation concentrating apparatus according to an embodiment of the present invention. FIG. 2 is a conceptual view illustrating a state of the solar radiation concentrating apparatus when a direction of incident solar radiation is varied, in the solar radiation concentrating apparatus illustrated in FIG. 1.

In FIG. 1 and FIG. 2, the solar radiation concentrating apparatus 1 includes a plurality of reflectors 10, a plurality of reflector vertical bars 20, a plurality of center of rotation providing members 30, a plurality of moving members 40, and a guide member 50.

In order to receive solar radiation concentrated by the solar radiation concentrating apparatus 1, a solar energy conversion apparatus 100 is installed in a prescribed concentration region above the solar radiation concentrating apparatus. As the solar energy conversion apparatus 100, a solar battery, a solar heat device, a distillation device, a heat engine, a solar heat power generation system, a solar heat closed fluid path gas turbine power generation system, a solar heat open fluid path gas turbine power generation system, a sunlight illumination system, and/or a solar furnace, etc. may be used.

In FIG. 1 and FIG. 2, three arrows X, Y, and Z, which are perpendicular one after another, designate an XYZ-orthogonal coordinate system which moves with the solar radiation concentrating apparatus 1. The arrow X, the arrow Y, and the arrow Z designate X-axis, Y-axis, and Z-axis, respectively. The XYZ-orthogonal coordinate system is used for facilitating the explanation hereinafter. Further, an arrow S shows a direction of incident solar radiation. The arrow S of FIG. 1 is parallel to the Z-axis. A Y-component of a vector parallel to the arrow S of FIG. 2 is zero.

Each reflector 10 is a flat reflector. Alternatively, a convex reflector or a concave reflector such as a parabolic reflector, a Fresnel reflector, a directional convergence reflector and so forth may be used. Further, a spectroscopic reflector member or another reflective optical element maybe used as the reflector. In FIG. 1, nine reflectors are illustrated. In general, many reflectors may be used. For example, 2-1000,000 reflectors may be loaded on the solar radiation concentrating apparatus 1. Each flat reflector 10 includes a circular circumference.

Alternatively, each plane reflector may include a square, hexagonal, rectangular, or another contour. When the plurality of reflectors are disposed densely, a means may be provided for preventing each reflector from being brought into contact with the adjoining reflectors, due to the rotation in a reflective surface.

The plurality of reflector vertical bars 20 are rigidly connected to the plurality of reflectors 10, respectively. Each reflector vertical bar 20 is disposed perpendicular to the reflective surface of the corresponding reflector. The plurality of reflectors 10 are respectively driven through the plurality of reflector vertical bars 20, for tracking solar radiation.

The plurality of reflector vertical bars 20 are capable of being freely rotated around the plurality of center of rotation providing members 30 as the rotational centers, respectively.

The plurality of center of rotation providing members 30 are arranged on a level reflector arrangement surface. Alternatively, the plurality of center of rotation providing members may be arranged along a slope, a vertical surface, or a curved surface. Further, the plurality of center of rotation providing members 30 may be an integrated member defining the reflector arrangement surface. In FIG. 1, nine center of rotation providing members 30 are arranged in three lines and three rows. In general, the form of arrangement of the plurality of center of rotation providing members 30 is optional. For example, the plurality of center of rotation providing members 30 may be disposed on lattice points having any two-dimensional periodicity, for example, a plurality of triangular lattice points which cover the reflector arrangement surface. Alternatively, the plurality of center of rotation providing member 30 may be arranged without symmetry or periodicity. The reflector arrangement surface may include a circular, rectangular, hexagonal, or another shape.

Each moving member 40 is supported by a pair of bearings 42. Therefore, each moving member 40 is capable of being rotated around a rotational axis parallel to the Y-axis. A hole 40A is bored through each moving member 40 along a curve having a prescribed shape approximately extending along the Y-axis. The hole 40A of each moving member is the hole which is bored through a cylindrical plate around the rotational axis parallel to the Y-axis. The reflector vertical bars 20 supported by the center of rotation providing members 30 having the same X-component penetrate through the hole 40A of each moving member. Each reflector vertical bar 20 includes a structure capable of being slid along the extending direction of the hole 40A. With respect to a direction perpendicular to the extending direction of the hole 40A, an appropriate play is secured for a smooth slide of the reflector vertical bar 20 along the extending direction of the hole 40A.

When a high concentration ratio is requested, such a play, or the gap between the reflector vertical bar 20 and the hole 40A with respect to the direction perpendicular to the extending direction of the hole 40A is designed so as to be small. In order to perform the smooth sliding of the reflector vertical bar 20, a pulse vibration generator which finely and intermittently vibrates the moving member may be provided. A bearing (not shown) which smoothly slides in the hole 40A may be provided for each reflector vertical bar 20. Further, the center of gravity of the combined body of each reflector 10 and the reflector vertical bar 20 connected thereto may be positioned at the center of rotation providing member 30.

In order to prevent the deformation of the plurality of reflector vertical bars 20, the plurality of center of rotation providing members 30, the plurality of moving members 40, and the guide member 50 due to the own gravity, when especially high concentration ratio is required, these may be accommodated in a container (not shown) which is filled with liquid such as water providing buoyancy. In this case, a complex material having a specific gravity near the specific gravity of the liquid may be used. The container may include a transparent cover and a dew-preventing means. The plurality of reflectors 10 may also be soaked in the water. Further, an appropriate water treatment may be performed for preventing the propagation of microbes in the water. Further, an appropriate step for preventing the piling up of air bubbles may be performed, for example, a step for removing dissolved gases in a decompressed atmosphere.

In order to collectively rotate the plurality of moving members 40, a link 44 is connected to the plurality of moving members 40. A pivot 46 is provided at a connecting part of each moving member 40 with the link 44. By moving the link 44 in the XZ-plane, the plurality of moving member 40 is simultaneously rotated with the same angular variation amount around respective rotational axes parallel to the Y-axis.

According to a variation of an angle of elevation of incident solar radiation, namely, according to the variation of the angle between a vector parallel to incident solar radiation and the horizontal plane, the plurality of moving members 40 are rotated with a prescribed angle. The amount of angular variation of the plurality of moving members 40 is a half of the variation of the angle of elevation of incident solar radiation. Namely, each moving member is moved with a prescribed orbit (hereinafter referred to as moving member orbit) according to the variation of the angle of elevation of incident solar radiation. Thus, the plurality of reflector vertical bars 20 are respectively rotated through the movements of the plurality of moving members. When the solar radiation concentrating apparatus includes many reflectors, the link may be plural.

The guide member 50 has a plate-like shape. The plate surface is parallel to the reflector arrangement surface. A plurality of holes 50A as guide grooves are bored through the guide member 50. Each hole 50A extends along a curve having a prescribed shape extending approximately along the direction of the X-axis. The above-mentioned plurality of reflector vertical bars 20 penetrate through the plurality of holes 50A, respectively. Each reflector vertical bar 20 is capable of being slid along the extending direction of the hole 50A. With respect to a direction perpendicular to the extending direction of the hole 50A, an appropriate play for the smooth sliding of the reflector vertical bar 20 along the extending direction of the hole 50A is secured.

In the state as illustrated in FIG. 1, each reflector 10 has a surface angle so as to reflect solar radiation toward the solar energy conversion apparatus 100.

The solar radiation concentrating apparatus 1 has a structure so as to be capable of being rotated around a straight line passing through the solar energy conversion apparatus 100 and parallel to the Z-axis. For this purpose, a rotational mechanism (not shown) may be provided. The solar radiation concentrating apparatus 1 further includes a base plate 70 and a plurality of pillars 72 for loading a structural body having the plurality of reflectors 10, the plurality of reflector vertical bars 20, the plurality of center of rotation providing members 30, the plurality of moving members 40, and the guide member 50.

In FIG. 2, incident solar radiation parallel to an arrow S is obliquely incident on the reflector arrangement surface. In this case, the base plate 70 is rotated so that the Y-component of a vector parallel to the incident solar radiation is caused to be zero in the above-mentioned XYZ-coordinate system. In order to confirm this state, an incident direction indicating member 60 is provided. The incident direction indicating member 60 is rigidly connected to the guide member 50. The incident direction indicating member 60 includes a bar 62 parallel to the Z-axis and an indicator line 64 parallel to the X-axis. As mentioned above, because the XYZ-coordinate system is the coordinate system which moves with the solar radiation concentrating apparatus 1, the geometrical condition parallel to the X-axis is maintained in the indicator line 64 even when the solar radiation concentrating apparatus 1 is rotated. The position of the solar radiation concentrating apparatus 1 is adjusted so that the shadow of the bar 62 is caused to be parallel to the indicator line 64. Namely, the position of the solar radiation concentrating apparatus 1 is controlled so that the Y-component of the vector parallel to the incident solar radiation is caused to be always zero.

In this controlled state, a directional variation of a unit vector parallel to incident solar radiation with respect to the XYZ-coordinate system is confined to only the XZ-plane. Namely, only the angle of elevation of incident solar radiation varies. In this case, by specifying an X-component of a unit vector having the same direction of the incident solar radiation, the incident direction of the incident solar radiation with respect to the XYZ-coordinate system can be determined uniquely.

An example of a method for determining the shapes of the plurality of holes 50A which are bored through the guide member 50 is explained hereinbelow.

As mentioned above, each reflector 10 is provided for reflecting incident solar radiation having the incident direction whose Y-component is zero, toward the above-mentioned solar energy conversion apparatus 100. The prescribed direction for each reflector such that the reflected solar radiation beam reflected by each reflector 10 is correctly directed to the solar energy conversion apparatus 100 is substantially fixed, with respect to the XYZ-coordinate system. Further, the position of each center of rotation providing member 30 is also substantially fixed, with respect to the XYZ-coordinate system.

Therefore, the prescribed position of the reflector vertical bar 20 which is requested for always irradiating the solar radiation conversion apparatus 100 with the reflected solar radiation reflected by each reflector 10 can be determined as a function of the angle of elevation of the incident solar radiation with respect to the reflector arrangement surface, by a numerical calculation for example. Therefore, in the case in which an X-component of a unit vector having the same direction as the incident solar radiation consecutively varies within a prescribed range, for example, from zero to one, respective prescribed orbits of the plurality of reflector vertical bars (hereinafter referred to as prescribed reflector vertical bar orbits) can be determined by the X-component of the unit vector as the parameter.

Thus, the tracks of the points of intersection between the plurality of reflector vertical bars 20 being moved with the prescribed reflector vertical bar orbits and the guide member 50 (hereinafter referred to as guide member tracks) can be determined, by a numerical calculation for example. The plurality of holes 50A bored through the guide member 50 extend along the guide member tracks determined as mentioned above. FIG. 3 illustrates the shapes of the plurality of holes 50A bored through the plate-like guide member 50.

As mentioned above, each moving member 40 is moved along the prescribed moving member orbits in accordance with the variation of the angle of elevation of incident solar radiation. Therefore, tracks (hereinafter referred to as moving member tracks) which are respectively drawn on the plurality of moving members 40 by the points of intersection between respective moving members being moved along the prescribed moving member orbits and the plurality of reflector vertical bars 20 being moved along the above-mentioned reflector vertical bar orbits can be determined by a numerical calculation for example. The hole 40A bored through each moving member 40 extends along the moving member track. The shape of the hole 40A is thus determined. In other words, respective prescribed shapes of the holes 50A and the holes 40A which are required for precisely concentrating the solar radiation in all incident angle range of solar radiation can be determined by the numerical calculation.

A solar radiation concentrating method in the solar radiation concentrating apparatus 1 having the above-mentioned structure is explained hereinbelow. Accordingly, the method for concentrating solar radiation according to another embodiment of the present invention includes a step of rotating the solar radiation concentrating apparatus 1 around a straight line perpendicular to the reflector arrangement surface so that incident solar radiation is incident along a prescribed direction in the reflector arrangement surface and a step of positioning the plurality of moving member 40 to a prescribed position determined in accordance with an angle of elevation of the incident solar radiation. In principle, the solar radiation reflected by each reflector is thereby correctly directed toward a prescribed direction, in all of the incident angle range. Accordingly, a high concentration ratio is realized all over the incident angle range.

The solar radiation concentrating apparatus 1 may further include a plurality of optical sensors 102 for measuring sunlight intensity near the solar energy conversion apparatus 100 and a controller 104 which controls the moving member using a signal detected by the optical sensors 102. A solar radiation concentrating method for the solar radiation concentrating apparatus 1 is explained hereinbelow.

Namely, the method for concentrating solar radiation according to still another embodiment of the present invention includes a step of rotating the solar radiation concentrating apparatus 1 around a straight line perpendicular to the reflector arrangement surface so that incident solar radiation is incident along a prescribed direction in the reflector arrangement surface, a step of measuring a differential signal of solar energy intensity near a solar energy collecting region using the optical sensors 102, and a step of controlling the position of the moving member using the controller 104, on the basis of the differential signal. The control of the moving member on the basis of the differential signal may be performed only when the direct solar radiation reaches to a prescribed intensity. In principle, the solar radiation reflected by each reflector 10 is thereby correctly directed to a prescribed direction, in all of the incident angle range. Accordingly, a high concentration ratio is achieved all over the incident angle range.

In order to preferably performing the tracking, the solar radiation concentrating apparatus may include an optical sensor in a position other than the prescribed concentration region and a controller which controls the moving member by a signal detected from the sensor. A solar radiation concentrating method in this case is explained hereinbelow.

Namely, the method for concentrating solar radiation according to still another embodiment of the present invention includes a step of rotating the solar radiation concentrating apparatus around a straight line perpendicular to the reflector arrangement surface so that incident solar radiation is incident along a prescribed direction in the reflector arrangement surface, a step of monitoring a propagation direction of reflected light for the direction of solar radiation reflected at least one of the plurality of reflectors in a monitoring surface disposed in a position different from the solar energy conversion apparatus, and a step of controlling the position of the moving member so that the direction of the reflected solar radiation is directed to a prescribed direction. In principle, the solar radiation reflected by each reflector 10 is thereby correctly directed to a prescribed direction in all of the incident angle range. Accordingly, a high concentration ratio is achieved all over the incident angle range.

Figure 4:
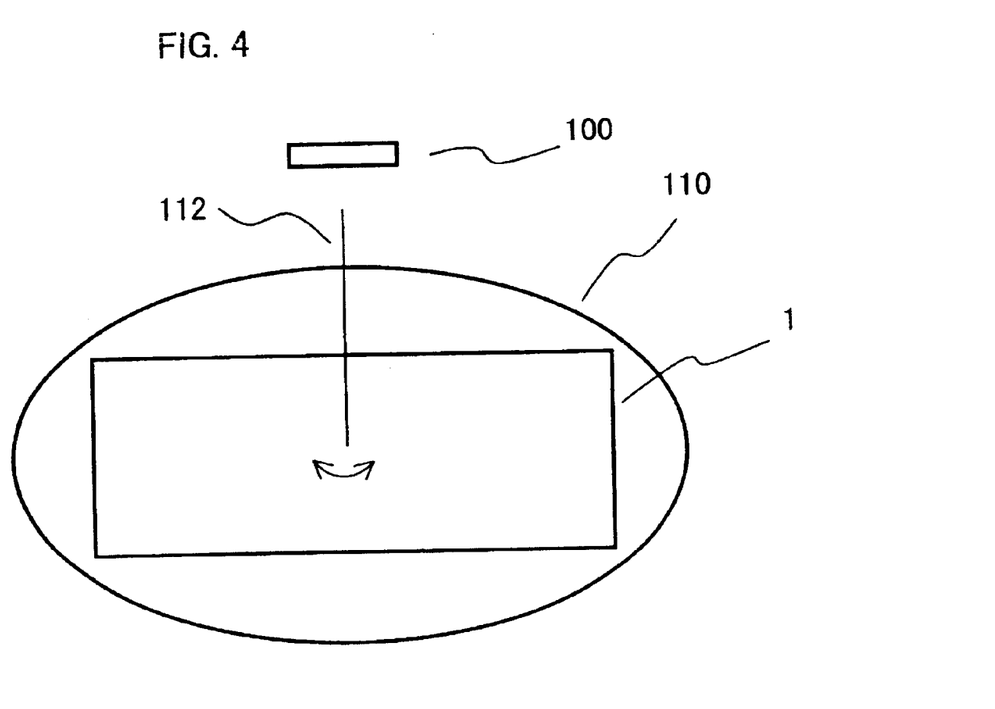
FIG. 4 is a conceptual view illustrating a solar radiation concentrating apparatus according to another embodiment of the present invention.

FIG. 4 is a conceptual view illustrating an installation state of a solar radiation concentrating apparatus according to still another embodiment of the present invention. The solar radiation concentrating apparatus 1 is installed on the surface of the water in a pond 11. For the purpose of this, a base (not shown) for receiving buoyancy is used. As illustrated by an arrow of FIG. 4, the solar radiation concentrating apparatus 1 is capable of being rotated around a straight line 112 which is perpendicular to the surface of the pond 110 and which passes through the solar energy conversion apparatus 100. According to the utilization of the buoyancy of water, a motive power required for rotating the solar radiation is greatly reduced. The solar radiation concentrating apparatus 1 illustrated in FIG. 4 includes a square contour. Alternatively, the contour of the solar radiation concentrating apparatus may be another shape, for example, a circular shape. An anchor or a wave-extinguishing member may be provided.

Figure 5:
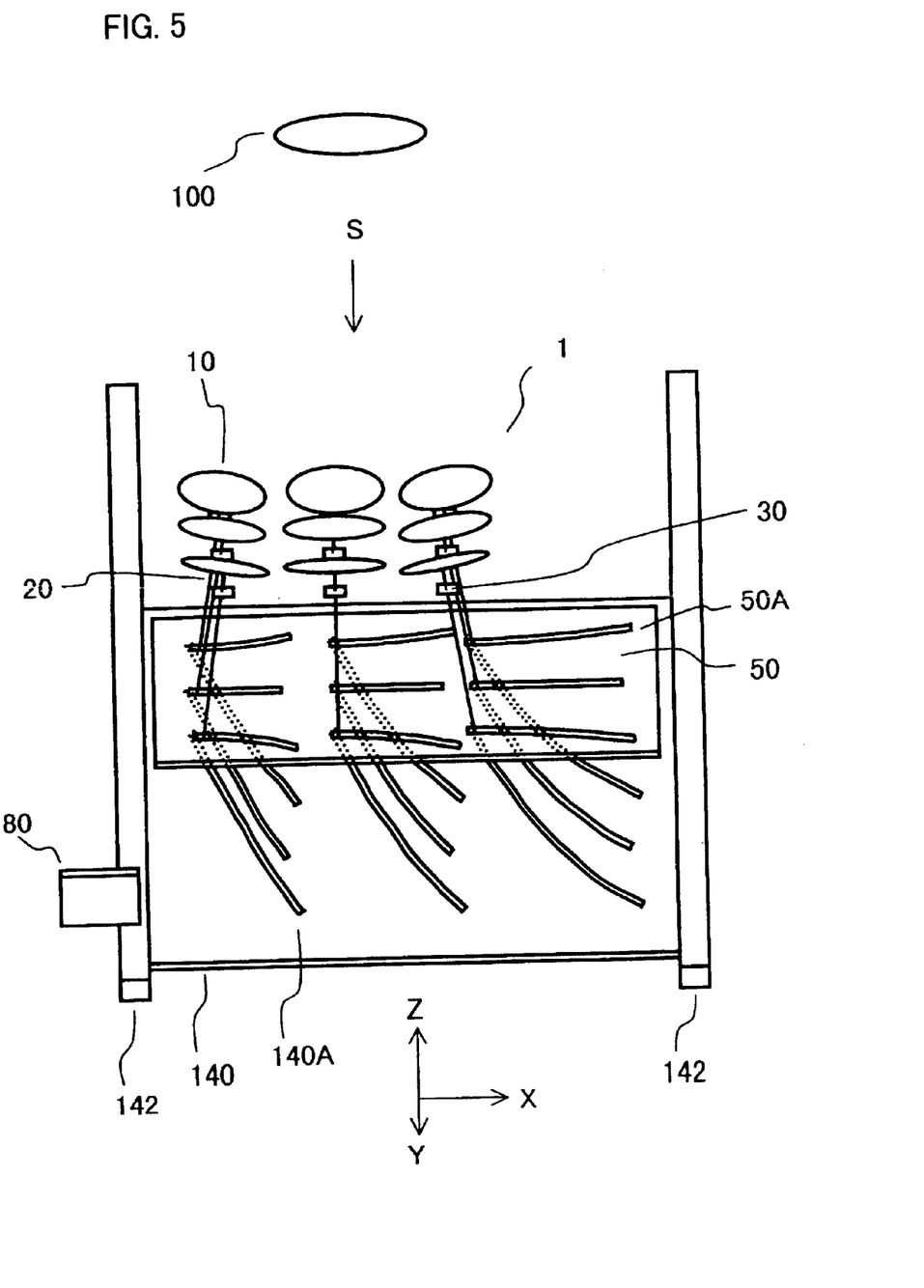
FIG. 5 is a conceptual view illustrating a solar radiation concentrating apparatus according to still another embodiment of the present invention.
Figure 6:
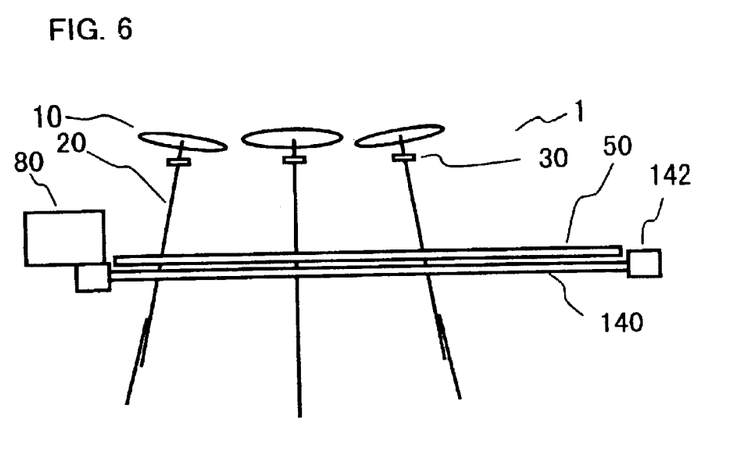
FIG. 6 is a schematic view illustrating the front of the solar radiation concentrating apparatus illustrated in FIG. 5.
Figure 7:
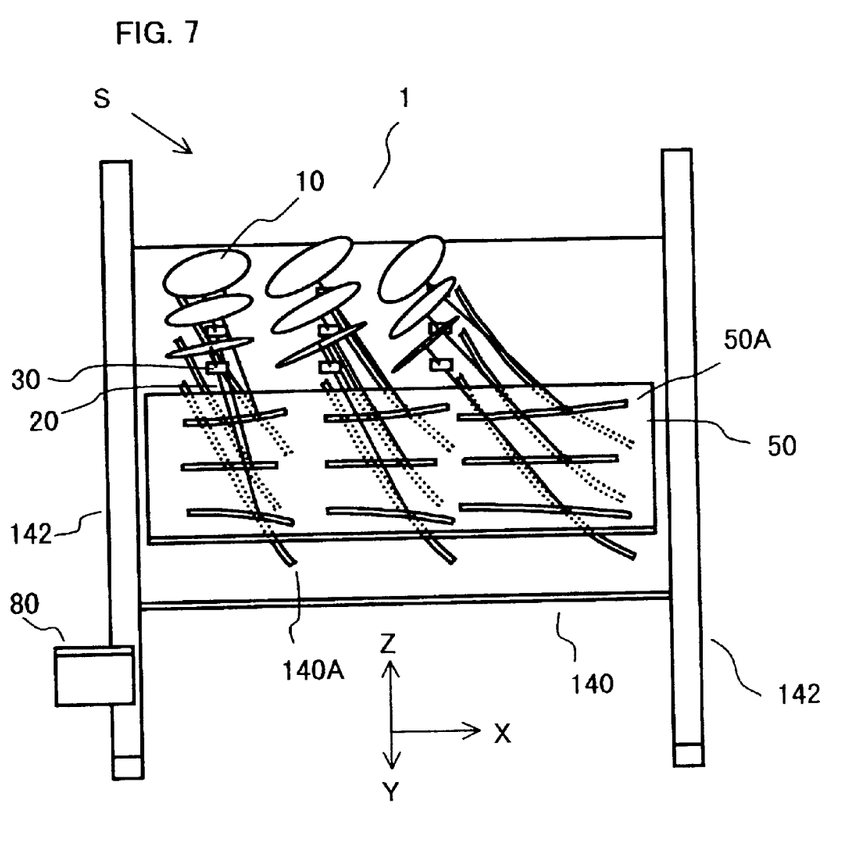
FIG. 7 is a conceptual view illustrating a state of the solar radiation concentrating apparatus when an incident angle of incident solar radiation is varied, in the solar radiation concentrating apparatus illustrated in FIG. 5.

Referring to FIGS. 5–7, a solar radiation concentrating apparatus according to still another embodiment of the present invention is explained. FIG. 5 is a conceptual view illustrating the solar radiation concentrating apparatus according to still another embodiment of the present invention. FIG. 6 is a view illustrating the front of the solar radiation concentrating apparatus illustrated in FIG. 5. FIG. 7 is a conceptual view illustrating a sate of the solar radiation concentrating apparatus when incident solar radiation has varied, in the solar radiation concentrating apparatus illustrated in FIG. 5. In FIG. 5, the XYZ-coordinate system which moves with the solar radiation concentrating apparatus 1 is illustrated, in which the solar radiation concentrating apparatus 1 is drawn from the viewing angle where the Z-axis and the Y-axis overlap with a straight line. Therefore, the side of the solar radiation concentrating apparatus is not drawn. In FIG. 5, incident solar radiation S is incident parallel to the Z-axis. In FIG. 7, a Y-component of a vector parallel to the incident solar radiation is zero.

The solar radiation concentrating apparatus 1 includes a plurality of reflectors 10, a plurality of reflector vertical bars 20, a plurality of center of rotation providing members 30, a moving member 140, and a guide member 50.

The plurality of reflectors 10, the plurality of reflector vertical bars 20, the plurality of center of rotation providing members 30, and the guide member 50 has a similar structure as illustrated in FIG. 1.

The solar radiation concentrating apparatus 1 further includes an optical sensor 80. Photodetectors are provided on both sides of the optical sensor 80. The whole solar radiation concentrating apparatus is rotated so that a differential signal of the photodetectors is caused to be zero.

The moving member 140 has a flat board shape. The moving member 140 is capable of being moved in a direction parallel to the Y-axis. A pair of guide rails 142 are provided for a movement of the moving member 140. The moving member 140 is moved with a prescribed orbit in accordance with a variation of the angle of elevation of incident solar radiation S. For example, the moving member 140 is moved along the Y-axis with a prescribed distance proportional to the angular variation of incident solar radiation.

Shapes of a plurality of holes 140A bored through the moving member 140 can be determined on the basis of the above-mentioned principle. As illustrated in FIG. 6, the plurality of reflector vertical bars 20 penetrate through the guide member 50 and the moving member 140, respectively.

As illustrated in FIG. 7, the moving member 140 in cooperation with the guide member 50 drives the plurality of reflector vertical bars 20 collectively. A driving member and a control system (not shown) may be provided.

Figure 8:
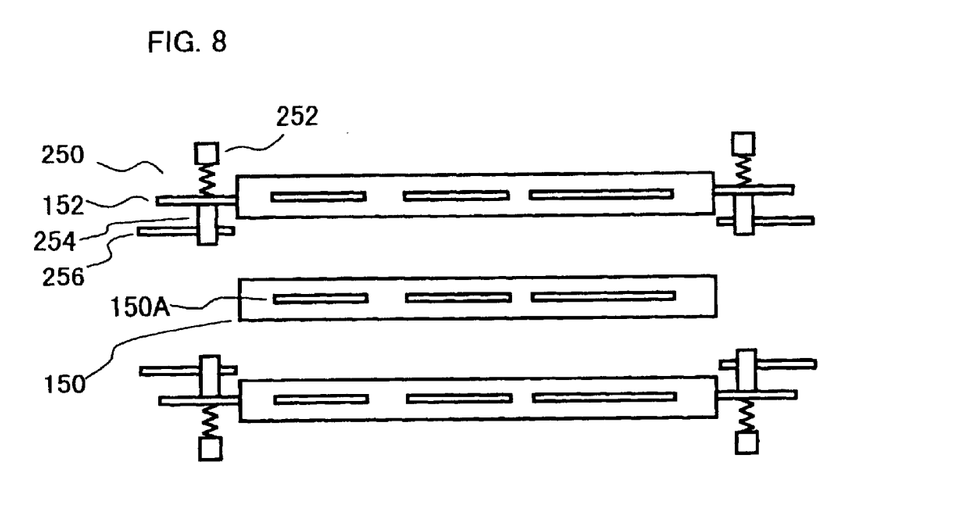
FIG. 8 is a schematic view illustrating a guide member used in a solar radiation concentrating apparatus according to still another embodiment of the present invention.

FIG. 8 is a schematic view illustrating a guide member used in a solar radiation concentrating apparatus according to still another embodiment of the present invention.

For example, in the solar radiation concentrating apparatus illustrated in FIG. 6, the guide member 50 may be replaced by a plurality of guide member 150 having a plurality of straight holes 150A illustrated in FIG. 8. For the guide members 150 except for one, a plurality of guide member driving systems 250 are provided. The plurality of guide member driving systems 250 respectively shift positions of the plurality of guide members 150 with respect to Y-components in accordance with the above-mentioned position of the moving member 140. Each guide member driving system 250 includes a cam 254 which drives the guide member through a handle 152, a shaft 256 for the cam 254, and a spring member 252. The guide member may be used for the concentration of solar radiation at a relatively small concentration ratio.

Figure 9:
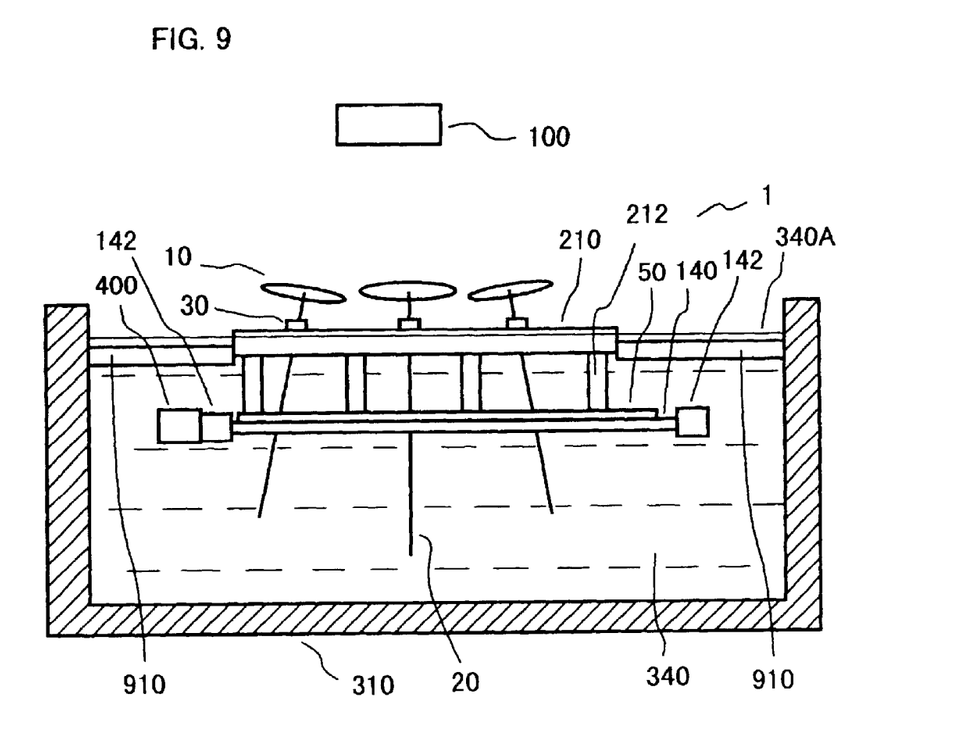
FIG. 9 is a conceptual view illustrating a solar radiation concentrating apparatus according to still another embodiment of the present invention.

FIG. 9 is a conceptual view illustrating a solar radiation concentrating apparatus according to still another embodiment of the present invention. The solar radiation concentrating apparatus 1 includes a plurality of reflectors 10, a plurality of reflector vertical bars 20, a plurality of center of rotation providing members 30, a moving member 140, a pair of guide rails 142, a moving member driving mechanism 400 driving the moving member 140, a guide member 50, a floating body 210, and a plurality of pillars 212.

The solar radiation concentrating apparatus 1 is supported utilizing buoyancy of water 340 stored in a container 310. In FIG. 9, a straight line 340A designates the water level of the water 340.

The floating body 210 supports the plurality of center of rotation providing members 30. Utilizing the buoyancy of the floating body 210, the plurality of reflectors 10 and the plurality of center of rotation providing members 30 are supported. The plurality of reflectors 10 are arranged above the floating body 210.

The plurality of pillars 212 maintain a prescribed distance between the floating body 210 and the guide member 50. The pillars 212 and the guide member 50 may have respective specific gravities near that of the water.

The moving member 140 is mounted on the pair of guide rails 142. As the moving member 140, a member having a specific gravity less than that of water may be used. The moving member 140 is thereby given the buoyancy by the water, and is pressed on the guide member 50 at a prescribed pressure. Thus, the moving member 140 is disposed in the proximity of the guide member.

A pair of rotational mechanisms 910 rotate the solar energy conversion apparatus 1 around a straight line perpendicular to the water surface of the water 910 and through the solar energy conversion apparatus 100 disposed in a prescribed concentration region. Namely, the rotational mechanisms 910 rotate the floating body 210, the plurality of reflectors 10, the plurality of reflector vertical bars 20, the plurality of center of rotation providing members 30, the moving member 140, the guide member 50, the pair of guide rails 142, the moving member driving mechanism 400, and the plurality of pillars 212. In order to perform an accurate concentration of solar radiation, the pair of rotational mechanisms may be shifted in a direction parallel to the water surface. Alternatively, in order to correct a positional error of the concentration region, the solar energy conversion apparatus may be disposed in a movable state.

Figure 10:
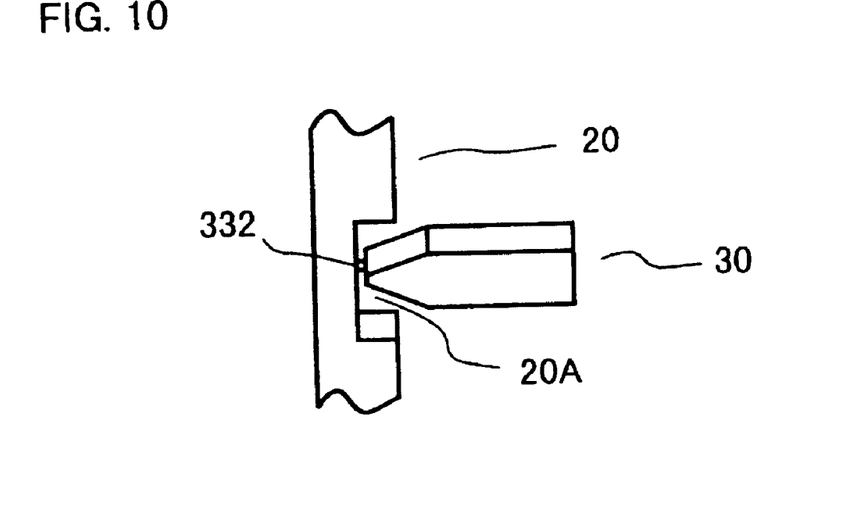
FIG. 10 is a schematic view illustrating a rotational fulcrum providing member and a reflector vertical bar used in a solar radiation concentrating apparatus according to still another embodiment of the present invention.

FIG. 10 is a schematic view illustrating a rotational fulcrum providing member and a reflector vertical bar used in a solar radiation concentrating apparatus according to still another embodiment of the present invention. The solar radiation concentrating apparatus includes a universal joint 332 provided between a center of rotation providing member 30 and a reflector vertical bar 20.

In the reflector vertical bar 20, a recessed part 20A is formed in a portion where the universal joint 332 is provided. The universal joint 332 is provided on a flat part of the recessed part 20A. The front edge of the center of rotation providing member 30 where the universal joint 332 is provided has a straight line shape. Thus, the reflector vertical bar 20 can be directed to any direction around the universal joint 332 as the rotational center. At the same time, a rotational movement of the reflector vertical bar 20 around own reflector vertical bar as the rotational shaft is prevented. The structure operates as a mechanism which prevents the rotation of the reflector in the reflective surface.

Figure 11:
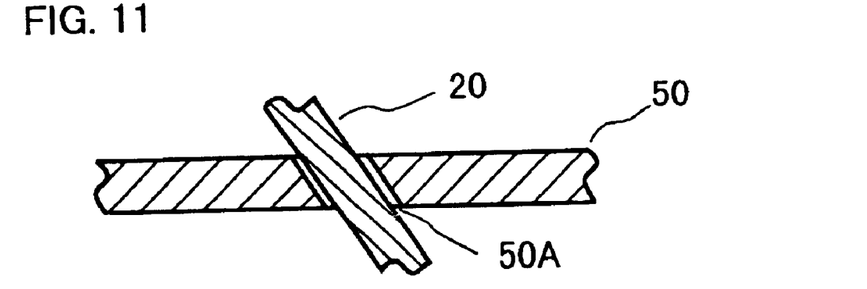
FIG. 11 is a schematic view illustrating a fitting state of a guide member and a reflector vertical bar used in a solar radiation concentrating apparatus according to still another embodiment of the present invention.

FIG. 11 is a schematic view illustrating a fitting state between a guide member and a reflector vertical bar used in a solar radiation concentrating apparatus according to still another embodiment of the present invention. In FIG. 11, the solar radiation concentrating apparatus includes a guide member 50 and a reflector vertical bar 20. A hole 50A having a prescribed sectional configuration suitable for the fitting of the reflector vertical bar is bored through the guide member 50. Thus, the position of the reflector vertical bar 20 is controlled with a high precision.

Figure 12:
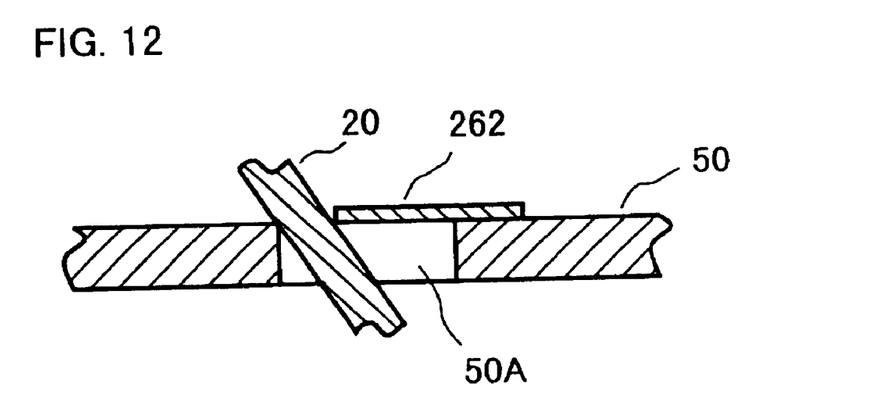
FIG. 12 is a schematic view illustrating a fitting state of a guide member and a reflector vertical bar used in a solar radiation concentrating apparatus according to still another embodiment of the present invention.

FIG. 12 is a schematic view illustrating a fitting state between a guide member and a reflector vertical bar used in a solar radiation concentrating apparatus according to still another embodiment of the present invention. In FIG. 12, the solar radiation concentrating apparatus includes a reflector vertical bar 20, a guide member 50, and an elastic body 262 provided in the hole 50A which is bored through the guide member 50. The elastic body 262 presses the reflector vertical bar 20 fitted into the hole 50A toward a prescribed direction. Thus, the position of the reflector vertical bar 20 is controlled at a high precision.

In the above, the solar radiation concentrating apparatus and the method for concentrating solar radiation according to the present invention are explained in detail. Besides, the present invention may be reduced into practice with a supplemental means for preferably operating the solar radiation concentrating apparatus and the method for concentrating solar radiation according to the present invention, for example, a Fresnel concave lens converting a converging optical beam reflected by the solar radiation concentrating apparatus into a parallel light beam, a spectroscopic element, a reflective light-amount controlling means, a temperature controlling means, an optical power meter, an adjusting means for adjusting a concentration ratio, a shading sidewall preventing the reflected light from a concentration region from reaching to the outside region, an information storage medium, an arithmetic processor, a means (not shown) for fixing each member, a guide member for preventing the contact between the reflectors, and/or an encoder about positional data of the moving member.

Namely, the present invention disclosed herein provides a novel solar radiation concentrating apparatus and a method for concentrating solar radiation, wherein in view of the detailed teachings disclosed in the above-explanation, the practice of the present invention is not limited to the above examples for explaining the best mode of the present invention, and wherein the present invention may be practiced as another embodiment with variations within the scope of the claims as follows or may be practiced without supplemental forms or constituting elements which are appended for explaining the best embodiment of the above examples.

INDUSTRIAL APPLICABILITY

According to the present invention as constituted above, the solar radiation concentrating apparatus having a high concentration ratio for a wide incident angle range of solar radiation is provided. Further, according to the solar radiation concentrating apparatus and the method for concentrating solar radiation according to the present invention, a novel solar energy system is realized, which includes a sunlight irradiation device, a photovoltaic power generation system, a solar heat system, a distillation device, a heat engine, a solar heat power generation system, a solar heat closed fluid path gas turbine power generation system, a sunlight illumination system, and/or a solar furnace, etc.

What is claimed is:

1. A solar radiation concentrating apparatus, comprising:
   a plurality of reflectors for reflecting incident solar radiation along a prescribed incident direction range, arranged in a reflector arrangement surface;
   a plurality of reflector vertical bars which are connected to the plurality of reflectors, respectively;
   a center of rotation providing member which defines central points of respective rotational movements of the plurality of reflectors;

a moving member for collectively rotating the plurality of reflector vertical bars; and a guide member which guides the movements of the plurality reflector vertical bars so that the plurality of reflector vertical bars are rotated along respective prescribed reflector vertical bar orbits, for concentrating the reflected solar radiation reflected from the plurality of reflectors to a prescribed concentration region, wherein the moving member is moved with a prescribed moving member orbit in accordance with a variation of an incident angle of the incident solar radiation, and wherein a hole is bored through the moving member along a curve corresponding to a track which is drawn on the moving member by points of intersection between the moving member being moved with the prescribed moving member orbit and the plurality of reflector vertical bars being moved with the respective prescribed reflector vertical bar orbits.

2. The solar radiation concentrating apparatus according to claim 1, wherein a guide groove having a prescribed shape for guiding the plurality of reflector vertical bars with a slidable state is bored through the guide member.

3. The solar radiation concentrating apparatus according to claim 1, further comprising a rotational mechanism, wherein the rotational mechanism rotates the plurality of reflectors, the plurality of reflector vertical bars, the center of rotation providing member, the moving member, and the guide member around a straight line perpendicular to the reflector arrangement surface so that a projection of the incident solar radiation is caused to be parallel to a prescribed incident direction indicating line defined in the reflector arrangement surface.

4. The solar radiation concentrating apparatus according to claim 1, wherein the moving member includes a link and a plurality of rotational bodies which are collectively rotated by the link and which rotate the plurality of reflector vertical bars.

5. The solar radiation concentrating apparatus according to claim 1, wherein the moving member is a flat board member.

6. The solar radiation concentrating apparatus according to claim 1, further comprising a floating body.

7. In a method for concentrating solar radiation by a solar radiation concentrating apparatus including a plurality of reflectors arranged in a reflector arrangement surface and for reflecting incident solar radiation along a prescribed incident direction region, a plurality of reflector vertical bars connected to the plurality of reflectors, respectively, a center of rotation providing member defining central points of respective rotational movements of the plurality of reflector vertical bars, a moving member for collectively rotating the plurality of reflector vertical bars, and a guide member guiding the movements of the plurality of reflector vertical bars so that the plurality of reflector vertical bars are rotated along respective prescribed reflector vertical bar orbits, for concentrating the reflected solar radiation reflected from the plurality of reflectors to a prescribed concentration region, the method for concentrating the solar radiation, comprising the steps of:

rotating the solar radiation reflecting apparatus around a straight line perpendicular to the reflector arrangement surface so that the incident solar radiation is caused to be incident along a prescribed direction in the reflector arrangement surface; and positioning the moving member to a prescribed position which is determined in accordance with an incident angle of the incident solar radiation.

* * * * *